US008795455B2

(12) United States Patent
Blanchard et al.

(10) Patent No.: US 8,795,455 B2
(45) Date of Patent: Aug. 5, 2014

(54) BONDED PATCHES WITH BOND LINE CONTROL

(75) Inventors: Steve Blanchard, Issaquah, WA (US); Aydin Akdeniz, Langley, WA (US); John Spalding, Renton, WA (US); David M. Anderson, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/554,554

(22) Filed: Sep. 4, 2009

(65) Prior Publication Data

US 2010/0276064 A1 Nov. 4, 2010

Related U.S. Application Data

(63) Continuation-in-part of application No. 12/328,903, filed on Dec. 5, 2008.

(51) Int. Cl.
*B29C 73/10* (2006.01)
*B29C 65/78* (2006.01)

(52) U.S. Cl.
CPC .............. *B29C 73/10* (2013.01); *B29C 65/7826* (2013.01); *B29C 65/7829* (2013.01)
USPC .......................................................... 156/94

(58) Field of Classification Search
None
See application file for complete search history.

(56) References Cited

U.S. PATENT DOCUMENTS

| 1,881,651 | A |   | 10/1932 | Judge |
| 2,795,854 | A |   | 6/1957 | Perkal |
| 3,046,670 | A |   | 7/1962 | Wydra |
| 3,389,474 | A |   | 6/1968 | Linn |
| 3,924,529 | A |   | 12/1975 | Atkinson |
| 4,874,648 | A | * | 10/1989 | Hill et al. ..................... 428/35.9 |
| 5,023,987 | A |   | 6/1991 | Wuepper et al. |
| 5,214,307 | A |   | 5/1993 | Davis |
| 5,232,962 | A |   | 8/1993 | Dershem et al. |
| 5,269,861 | A |   | 12/1993 | Gilbreath |
| 5,620,768 | A |   | 4/1997 | Hoffmann, Sr. |
| 5,833,795 | A | * | 11/1998 | Smith et al. ................. 156/272.4 |
| 5,865,397 | A |   | 2/1999 | Herrmann |
| 5,925,204 | A |   | 7/1999 | Hoffmann, Sr. |
| 5,958,166 | A |   | 9/1999 | Walters et al. |
| 6,073,577 | A | * | 6/2000 | Lilleland et al. ........... 118/723 E |

(Continued)

FOREIGN PATENT DOCUMENTS

| DE | 29709179 U1 | 7/1997 |
| GB | 154193 A | 7/1921 |

(Continued)

OTHER PUBLICATIONS

International Search Report, dated Nov. 22, 2010, regarding Application No. PCT/US2010/044423 (WO2011028355), 3 pages.

(Continued)

*Primary Examiner* — Barbara J Musser
(74) *Attorney, Agent, or Firm* — Yee & Associates, P.C.

(57) ABSTRACT

A patch may be used to rework a composite structure in the field. The patch is bonded to the structure by a layer of adhesive and includes perforations that allow the escape of air from the adhesive as the patch is compressed against the structure. A spacer may be introduced between the patch and the structure to control the thickness of the adhesive layer.

13 Claims, 11 Drawing Sheets

(56) References Cited

U.S. PATENT DOCUMENTS

| | | | |
|---|---|---|---|
| 6,124,016 A * | 9/2000 | Weil | 428/99 |
| 6,286,224 B1 | 9/2001 | Lewis | |
| 6,472,758 B1 | 10/2002 | Glenn et al. | |
| 6,889,442 B2 | 5/2005 | Bouvier | |
| 6,904,690 B2 | 6/2005 | Bakke et al. | |
| 7,229,683 B2 * | 6/2007 | Fischer et al. | 428/293.7 |
| 7,306,851 B2 | 12/2007 | Panse | |
| 7,350,311 B2 | 4/2008 | Marks | |
| 7,495,862 B2 | 2/2009 | Flores et al. | |
| 7,575,778 B2 | 8/2009 | Su et al. | |
| 7,686,905 B2 * | 3/2010 | Ackerman et al. | 156/94 |
| 8,109,312 B2 | 2/2012 | Schober | |
| 2003/0005995 A1 * | 1/2003 | Miller | 156/98 |
| 2004/0113483 A1 | 6/2004 | Sylvester et al. | |
| 2004/0187331 A1 | 9/2004 | Bouvier | |
| 2005/0022923 A1 | 2/2005 | Korchnak et al. | |
| 2005/0051360 A1 | 3/2005 | Su et al. | |
| 2005/0112968 A1 | 5/2005 | Panse | |
| 2005/0272142 A1 * | 12/2005 | Horita | 435/287.1 |
| 2006/0176611 A1 | 8/2006 | Flores et al. | |
| 2007/0095457 A1 * | 5/2007 | Keller et al. | 156/94 |
| 2009/0139638 A1 | 6/2009 | Flores et al. | |
| 2009/0165928 A1 | 7/2009 | Schober | |
| 2010/0143722 A1 | 6/2010 | Anderson et al. | |
| 2010/0276065 A1 | 11/2010 | Blanchard et al. | |
| 2012/0111478 A1 | 5/2012 | Akdeniz et al. | |
| 2012/0137532 A1 | 6/2012 | Yeh | |

FOREIGN PATENT DOCUMENTS

| | | |
|---|---|---|
| GB | 746331 A | 3/1956 |
| GB | 2155637 A | 9/1985 |
| WO | 2009080038 A1 | 7/2009 |
| WO | 2011028355 A1 | 3/2011 |
| WO | 2012060944 A1 | 5/2012 |

OTHER PUBLICATIONS

USPTO Office Action, dated Jan. 14, 2011, regarding U.S. Appl. No. 12/328,903, 14 pages.
Response to Office Action, dated May 9, 2011, regarding U.S. Appl. No. 12/328,903, 24 pages.
USPTO Final Office Action, dated Jun. 8, 2011, regarding U.S. Appl. No. 12/328,903, 12 pages.
Response to Final Office Action, dated Sep. 30, 2011, regarding U.S. Appl. No. 12/328,903, 24 pages.
USPTO Advisory Action, dated Nov. 8, 2011, regarding U.S. Appl. No. 12/328,903, 6 pages.
USPTO Office Action, dated Jan. 13, 2011, regarding U.S. Appl. No. 12/613,810, 17 pages.
Response to Office Action, dated Apr. 19, 2011, regarding U.S. Appl. No. 12/613,810, 27 pages.
USPTO Final Office Action, dated Jun. 22, 2011, regarding U.S. Appl. No. 12/613,810, 16 pages.
Response to Final Office Action, dated Oct. 21, 2011, regarding U.S. Appl. No. 12/613,810, 31 pages.
International Search Report, dated Feb. 6, 2012, regarding Application No. PCT/US2011/053402 (WO2012060944), 6 pages.
Greene, "Chapter Five: Fabrication—Repair," In: Marine Composites, Eric Greene Associates, Inc., Annapolis, MD, Jul. 1999, pp. 285-299.
Notice of Allowance, dated Feb. 25, 2013, regarding U.S. Appl. No. 12/939,485, 5 pages.
Office Action, dated Nov. 2, 2012, regarding U.S. Appl. No. 12/939,485, 19 pages.
Office Action, dated Dec. 21, 2012, regarding U.S. Appl. No. 12/328,903, 23 pages.
Notice of Allowance, dated Oct. 21, 2013, regarding U.S. Appl. No. 13/897,526, 17 pages.
Notice of Allowance, dated Jan. 9, 2014, regarding U.S. Appl. No. 12/328,903, 5 pages.

* cited by examiner

BONDED PATCHES WITH BOND LINE CONTROL

CROSS REFERENCE TO RELATED APPLICATIONS

This application is a continuation-in-part of U.S. patent application Ser. No. 12/328,903 filed Dec. 5, 2008, the entire disclosure of which is incorporated by reference herein.

TECHNICAL FIELD

The present disclosure generally relates to bonding equipment and processes, and deals more particularly with a method and apparatus for reworking structures using bonded patches.

BACKGROUND

Adhesives may be used to bond parts and structures in a wide variety of applications. In the aircraft industry, for example, adhesives may be used to bond patches to a structure such as a skin panel in order to improve, rework and/or repair an area of the structure. In some cases, the patch and/or the structure may be formed of composite materials. After applying a layer of adhesive to the structure and/or the patch, pressure along with heat is applied to the patch in order to cure the adhesive and form a strong bond at the patch and structure. This bonding process is not easily performed in the field, and may therefore be normally carried out under controlled conditions such as, without limitation, within a maintenance/repair hanger facility where specialized handling equipment and skilled technicians with knowledge of composites are available.

The strength and/or longevity of a bonded patch may depend in part on the thickness of the adhesive, the evenness of the adhesive thickness over the area of the patch and/or the presence of voids or air pockets between the patch and the structure caused by, without limitation, porosity in the bond. Bond line thickness and porosity may be controlled to some degree by controlling the pressure that is applied to the patch during its installation. However, determining the exact pressure necessary to achieve a particular bond line thickness maybe difficult, and in any event, applying this exact pressure uniformly across the patch may be challenging. Film type adhesives of constant thickness represent one possible solution to the problems discussed above, however the use of film adhesives may not be practical in some applications because of the special handling that they may require, such as, without limitation, the need to refrigerate the film until it is ready for use.

Accordingly, there is a need for a method of bonding a patch to a structure that allows close control of bond line thickness over substantially the entire area of the patch, and which reduces or eliminates porosity in the bond due to voids. There is also a need for a method of bonding patches to structures that may be carried out in the field, using an adhesive that does not require special handling, is not highly dependent on an installer's skill and which yields consistent, repeatable results.

SUMMARY

In accordance with the disclosed embodiments, a method is provided for bonding patches on structures in which the bond line or thickness of the bonding adhesive may be controlled over substantially the entire area of the patch. The method may not require a high level of installer skill and may provide consistent, repeatable results, even when performed in the field. Perforations in the patch may reduce or eliminate porosity in the bond by allowing air and/or excess adhesive to escape from the patch as it is forced against a structure during a patching operation. Patch installation may be carried out relatively quickly in the field using a set of prepackaged, preconfigured components.

According to one disclosed embodiment, a method is provided of reworking an area of a structure. The method includes preparing a patch, including forming a plurality of perforations in the patch, and placing a layer of bonding adhesive between the structure and the patch. The patch is pressed against the structure to achieve a desired bond line thickness. The perforations in the patch allow air and excess adhesive to escape from the patch as the patch is being pressed against the structure. The thickness of the adhesive layer may be controlled by placing a spacer between the patch and the structure. The spacer may comprise a screen and/or a plurality of beads that maintain a desired spacing between the patch and the structure. The method may further include placing a caul plate over the patch, applying pressure to the caul plate and limiting the pressure applied to the periphery of the patch through the caul plate by introducing an anti-caul plate between the caul plate and the structure.

According to another number of embodiments, a method is provided of bonding a patch on a structure, comprising placing the patch on the structure and placing a layer of bonding adhesive between the patch and the structure. A caul plate is placed over the patch and the patch is pressed against the structure by applying pressure to the caul plate. The method further includes limiting the pressure applied to the periphery of the patch by the caul plate. Limiting the pressure applied to the periphery of the patch may be performed by using an anti-caul plate to react the force applied to the caul plate around the perimeter of the caul plate.

According to another embodiment, a patch is provided for use in reworking an area of a structure. The patch comprises a generally planar member adapted to be pressed against the structure and bonded thereto by a layer of adhesive. The planar member includes a plurality of perforations therein allowing air between the patch and the structure to escape through the planar member as it is pressed against the structure. The perforations in the planar member may each have a width sufficient to allow excessive adhesive to flow there through and escape from the patch. The planar member may comprise a pre-cured composite material. The patch may further include a spacer adapted to be placed between the planar member and the structure for controlling the thickness of the adhesive layer.

The disclosed embodiments satisfy the need for a method and apparatus for adhesively bonding a patch on a structure that may be carried out relatively quickly, and allow close control over bond line thickness while reducing or eliminating porosity in the bond.

The features, functions, and advantages can be achieved independently in various embodiments of the present disclosure or may be combined in yet other embodiments in which further details can be seen with reference to the following description and drawings.

BRIEF DESCRIPTION OF THE ILLUSTRATIONS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
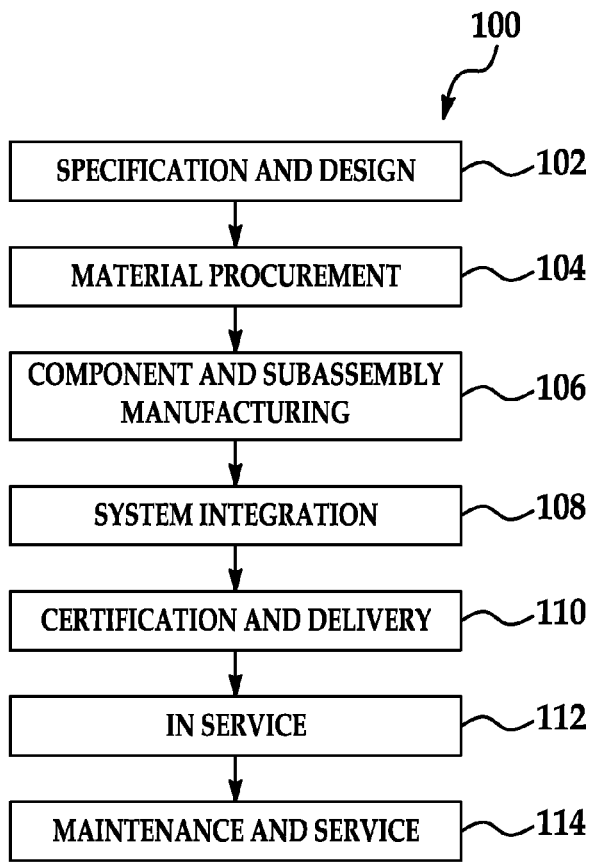
FIG. 1 is an illustration of a diagram showing an aircraft manufacturing and service method in accordance with an advantageous embodiment.
Figure 2:
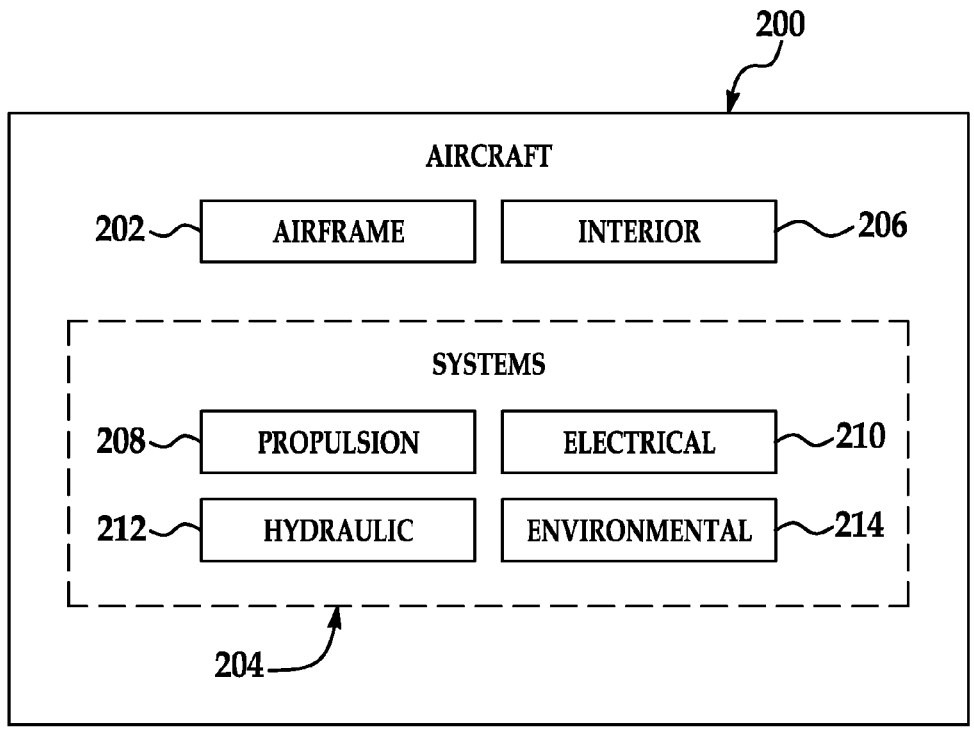
FIG. 2 is an illustration of a diagram showing an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

For example, without limitation, advantageous embodiments may be used to join parts for aircraft 200 during component and subassembly manufacturing 106 and/or system integration 108 of aircraft 200. Additionally, advantageous embodiments may be employed during maintenance and service 114 to perform reconfigurations and/or repairs of aircraft 200.

The different advantageous embodiments recognize and take into account that current processes for applying adhesive may not result in an even layer of adhesive being applied to an area in which bonding is to be performed. The different advantageous embodiments also recognize and take into account that the current processes may not provide a desired thickness for the adhesive layer even if the adhesive can be applied to form an even layer.

Thus, the different advantageous embodiments provide a method and apparatus for bonding parts. An adhesive and a plurality of beads are applied onto a surface of a first part through a screen to form a layer of adhesive beads. The surface of the first part with the layer of adhesive beads is placed into contact with the surface of the second part to form an adhesive layer containing beads to form a structure. The structure may then be cured.

In these examples, the screen may have a thickness, and applying the adhesive and the plurality of beads onto a first surface of the first part through the screen may result in the layer of adhesive and beads having substantially the thickness of the screen.

The plurality of beads may have a size capable of causing a substantially uniform thickness for the layer of adhesive and beads when applied to the first surface of the part. The beads may be capable of maintaining the substantially uniform thickness for the layer of adhesive when joining parts together. Pressure applied to one or more parts being joined may not result in an uneven thickness. Further, the size of the beads may maintain the thickness under pressure.

Figure 3:
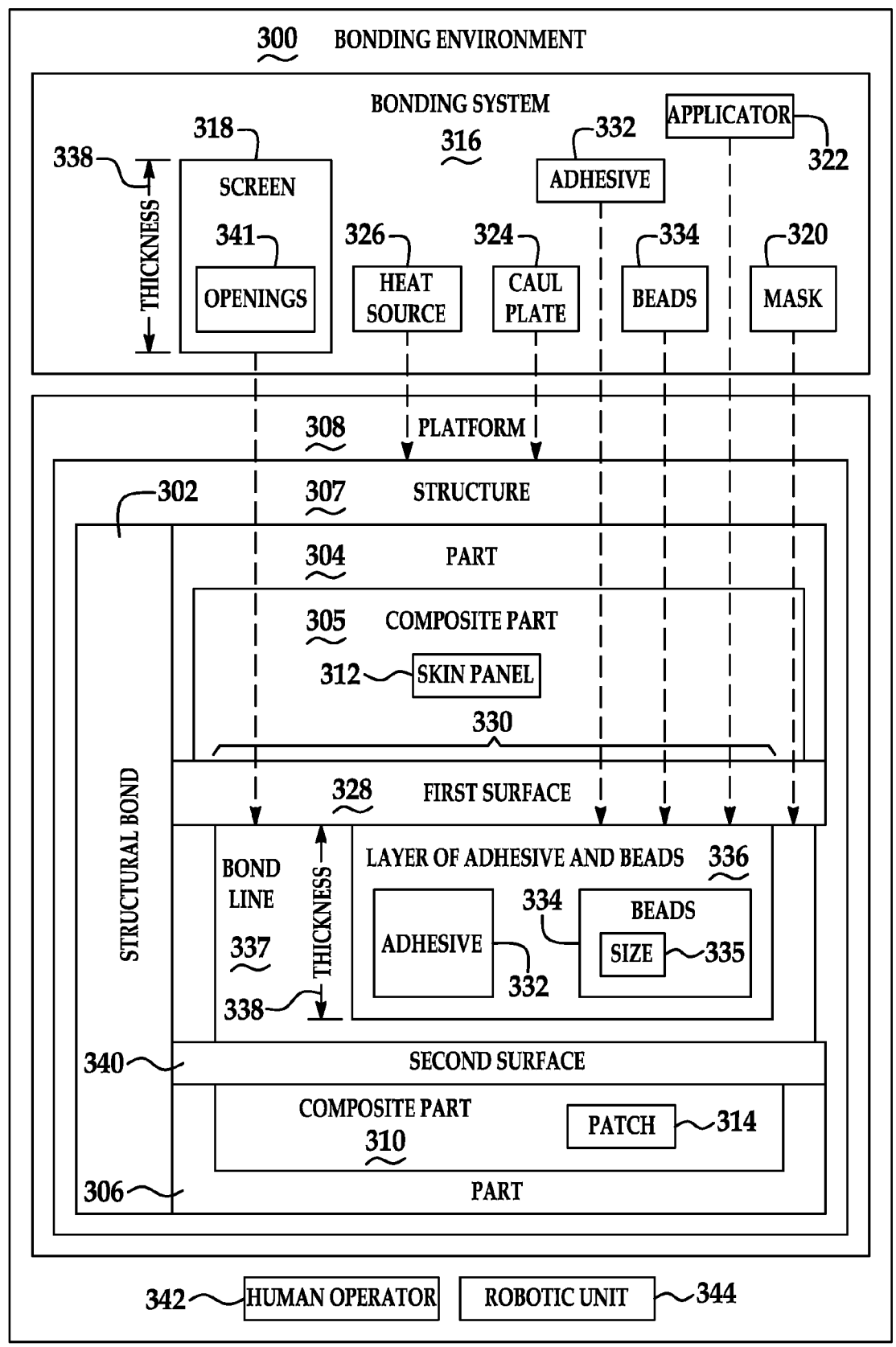
FIG. 3 is an illustration of a diagram showing a bonding environment in accordance with an advantageous embodiment.

With reference now to FIG. 3, a diagram of a bonding environment is depicted in accordance with an advantageous embodiment. In this illustrative example, bonding environment 300 may be used to create structural bond 302 between part 304 and part 306. Part 304 and part 306 may form structure 307. In these examples, part 304 and part 306 may be parts for platform 308. In these examples, platform 308 may be, for example, aircraft 200 in FIG. 2. Part 304 may take the form of composite part 305, and part 306 may take the form of composite part 310.

In these illustrative examples, composite part 305 may be skin panel 312, although other structures such as, and without limitation, floor panels, walls, frames, stringers, spars, doors, and other structures are contemplated. Composite part 310 may be patch 314. Part 304 and part 306 may be bonded to each other using bonding system 316. Bonding system 316 may include screen 318, template mask 320, applicator 322, caul plate 324, and heat source 326.

Template mask 320 may be placed onto first surface 328 of composite part 305 to expose area 330. Screen 318 may then be placed onto template mask 320. Adhesive 332 and beads 334 may be applied onto first surface 328 in area 330 through screen 318 to form layer of adhesive and beads 336. Layer of adhesive and beads 336, when cured, may take the form of bond line 337.

Adhesive 332 and beads 334 may be applied in a number of different ways. For example, adhesive 332 may be mixed with beads 334 and applied together to form a layer of adhesive and beads 336. In other advantageous embodiments, adhesive 332 may be applied through openings 341 in screen 318. Openings 341 may have various shapes and sizes depending on the particular implementation.

Openings 341 may have a size capable of allow beads 334 to pass through openings 341. Screen 318 also may have other parameters, such as, for example, without limitation, a screen weave, an opening between threads, a thread diameter, and/or other suitable parameters. These parameters may interact with bead size and adhesive properties, such as thickness, tackiness, surface tension, viscosity, and/or other adhesive properties.

Thereafter, beads 334 may be added to adhesive 332 on first surface 328 in area 330 to form layer of adhesive and beads 336. In these examples, screen 318 may have thickness 338, which may be substantially uniform. As a result, layer of adhesive and beads 336 also may substantially have thickness 338.

Some small excess amount of adhesive 332 with thickness 338 prior to joining, greater than the diameter of beads 334 may be applied to reduce and/or eliminate potential air gaps that may occur during joining of composite part 305 and composite part 310. During joining of part 305 and part 310 parts may be under vacuum bag pressure or other pressure to squeeze out excess adhesive while maintaining a uniform bond line with thickness 332 very near a diameter of beads 334. This ensures adequate fill occurs above all surface area. Applying screen 318 and subsequent spreading process may avoid layer of adhesive and beads 336 from having thickness 338 that may result in a bond line that may be thicker than desired and weaker than desired.

Applicator 322 may be used to apply adhesive 332 and/or beads 334 through screen 318 onto first surface 328 of composite part 305. Applicator 322 may remove excess adhesive 332 and/or beads 334 from screen 318 to form layer of adhesive and beads 336 having substantially thickness 338.

After layer of adhesive and beads 336 has been formed, screen 318 and template mask 320 may be removed. Second surface 340 of composite part 310 may be placed in contact with first surface 328 of composite part 305. Beads 334 within layer of adhesive and beads 336 may maintain layer of adhesive and beads 336 with substantially thickness 338. Beads 334 may provide a structural element that may maintain thickness 338 at substantially the same level. Without beads 334 in layer of adhesive and beads 336, thickness 338 may become uneven in portions of area 330.

In the different advantageous embodiments, adhesive 332 may be selected from any adhesive that may be suitable for creating structural bond 302 between part 304 and part 306. In the different advantageous embodiments, adhesive 332 may have a viscosity such that when screen 318 is removed from the layer of adhesive and beads 336, the layer of adhesive and beads 336 may maintain substantially thickness 338.

In one advantageous embodiment, adhesive 332 may be selected to have the viscosity, tackiness, and surface tension in its uncured state to allow an appropriate level of flow to occur when screen 318 is removed. Adhesive 332 with or without beads 334 may be selected to stick to first surface 328, while maintaining a flow that will allow adhesive 332 to remain on the structure and reflow slightly after screen 318 is removed. Part of the selection of adhesive 332 takes into account the working time of adhesive 332 so the properties may be maintained during the application of adhesive 332 and the joining of first surface 328 of composite part 305 and second surface 340 of composite part 310.

Adhesive 332 may vary depending on the materials for part 304 and part 306. For example, without limitation, when part 304 and part 306 takes the form of composite part 305 and composite part 310, adhesive 332 may be an adhesive suitable for composite components.

If composite part 305 and/or composite part 310 take the form of a metal or aluminum part, a different type of adhesive may be suitable. The particular adhesive selected may depend on the material of the parts being bonded to each other, the strength of the bond desired, and other suitable factors. Adhesives that may be used include, for example, without limitation, epoxy adhesives, urethane adhesives, acrylic adhesives, and other suitable adhesives.

Beads 334 may have size 335. Size 335 may be selected based on thickness 338 or some other desired thickness. Size 355 of beads 334 may be around thickness 338. Further, an amount of beads 334 within layer of adhesive and beads 336 may vary depending on the particular implementation. Beads 334 may be comprised of a material selected from at least one of glass, metal, ceramic, rubber, and/or some other suitable material. Beads 334 may be substantially incompressible in these examples.

This incompressibility may be desirable to avoid reducing thickness 338. As used herein, the phrase "at least one of", when used with a list of items, means that different combinations of one or more of the items may be used and only one of each item in the list may be needed. For example, "at least one of item A, item B, and item C" may include, without limitation, item A or item A and item B. This example also may include item A, item B, and item C, or item B and item C.

Structure 307 may be cured to create structural bond 302. In these examples, the curing may be performed for layer of adhesive and beads 336 to form structural bond 302 between part 304 and part 306. Curing of structure 307 may be performed using heat source 326. Heat source 326 may be, for example, without limitation, a heat pad, an autoclave, or some other suitable heat source. In some advantageous embodiments, caul plate 324 may be placed onto structure 307 for the curing process. In these examples, the different operations performed using bonding system 316 may be performed manually by human operator 342 and/or automatically by robotic unit 344.

The illustration of bonding environment 300 in FIG. 3 is not meant to imply physical or architectural limitations to the manner in which different advantageous embodiments may be implemented. In some advantageous embodiments, other components may be used in addition to, or in place of, the ones illustrated. In yet other advantageous embodiments, some components may be unnecessary.

For example, in some advantageous embodiments, the use of caul plate 324 may be unnecessary during the curing process. In yet other advantageous embodiments, vent holes may be formed in composite part 310 when composite part 310 takes the form of a patch. Vent holes may help squeeze out air trapped within layer of adhesive and beads 336. In yet other advantageous embodiments, structure 307 may be bagged for the curing process. Bagging may help to compress the bond line to the minimum thickness allowed by beads 334.

As another illustrative example, in some advantageous embodiments, screen 318 may be placed onto first surface 328 with template mask 320 being placed over screen 318. In yet other advantageous embodiments, template mask 320 may be unnecessary. In still other advantageous embodiments, adhesive 332 also may be placed on second surface 340 of part 306. In still other illustrative examples, advantageous embodiments may place an activator on second surface 340 of part 306. An activator may cause adhesive 332 to enter a state in which adhesive 332 cures or can be cured.

Figure 4:
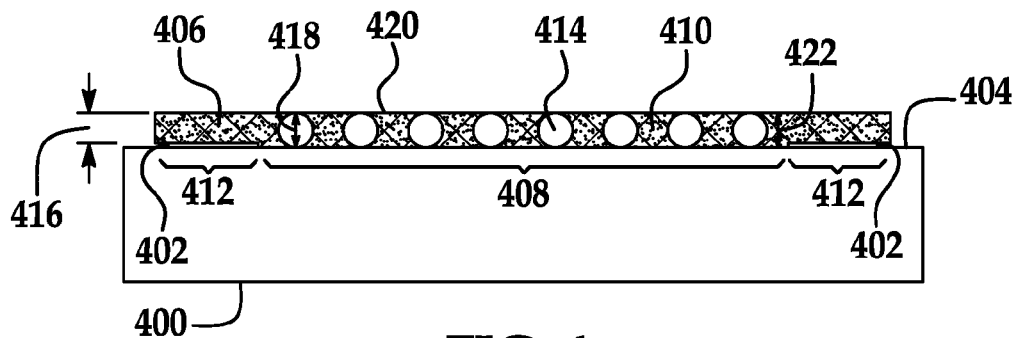
FIG. 4 is an illustration of a diagram showing a cross-sectional view of application of an adhesive in accordance with an advantageous embodiment.

With reference now to FIG. 4, a diagram of a cross-sectional view of an adhesive is depicted in accordance with an advantageous embodiment. In this example, part 400 is an example of part 304 in FIG. 3.

Part 400 may be, for example, without limitation, a skin panel or some other suitable part. Part 400 may be comprised of a material such as, for example, without limitation, a composite material, aluminum, titanium, and/or some other suitable material. In this example, mask 402 may be placed on surface 404 of part 400. Screen 406 may be placed onto mask 402. In these examples, mask 402 may expose area 408. Adhesive 410 may be applied onto surface 404 in area 408. Mask 402 may prevent adhesive 410 from being applied or deposited onto sections 412 on surface 404 outside of area 408. Beads 414 may be mixed with adhesive 410 or applied separately, depending on the particular implementation.

In these examples, screen 406 may have thickness 416. Beads 414 may have diameter 418. Diameter 418 may be substantially the same value as thickness 416 and may be substantially consistent between different beads in beads 414. With the use of screen 406, layer of adhesive and beads 420 may be applied to have thickness 422, which may be substantially the same thickness as thickness 416 in area 408. In other words, thickness 416 of screen 406 may set thickness 422 of layer of adhesive 410 and beads 420. Beads 420 may substantially maintain thickness 422 after screen 406 has been removed.

Figure 5:
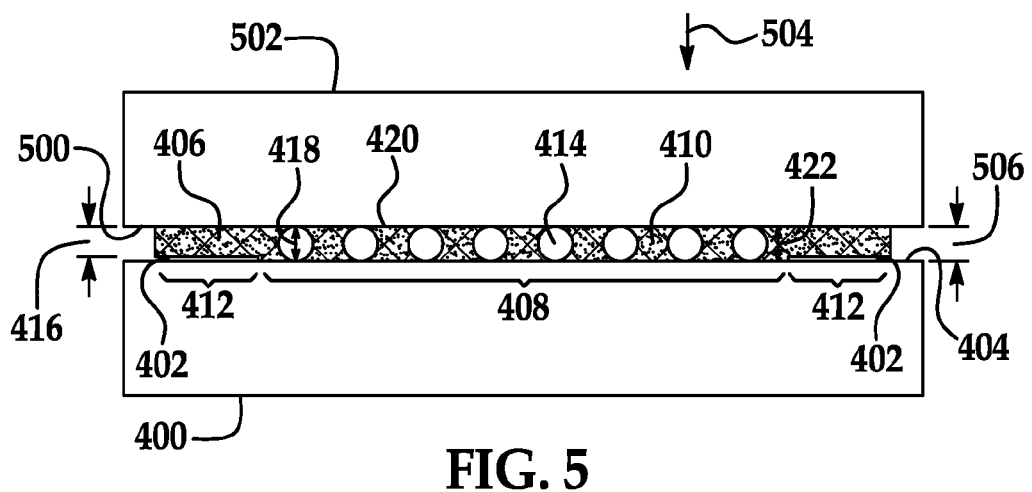
FIG. 5 is an illustration of a diagram showing a cross-sectional view of a structure with a layer of adhesive and beads in accordance with an advantageous embodiment.

Turning next to FIG. 5, a diagram of a cross-sectional view of a structure with a layer of adhesive and beads is depicted in accordance with an advantageous embodiment. In this illustrative example, surface 404 of part 400 may be placed into contact with surface 500 of part 502. Part 502 may be, for example, a patch or other repair piece for part 400.

In the different advantageous embodiments, force may be applied on part 502 in the direction of arrow 504. Beads 414 within layer of adhesive and beads 420 may reduce and/or prevent a reduction in thickness 422 beyond beads 414 thickness for layer of adhesive and beads 420. Further, beads 414 may prevent unevenness within thickness 422 in area 408 of layer of adhesive and beads 420. In these examples, beads 414 may be spherical in shape. Of course, any shape may be used, depending on the particular implementation. In these illustrative examples, any shape that may avoid stacking between beads 414 may be used for beads 414.

In some advantageous embodiments, thickness 422 may be greater than diameter 418. With this type of implementation, layer of adhesive and beads 420 may reduce in value to thickness 506 based on diameter 418 of beads 414.

Figure 6:
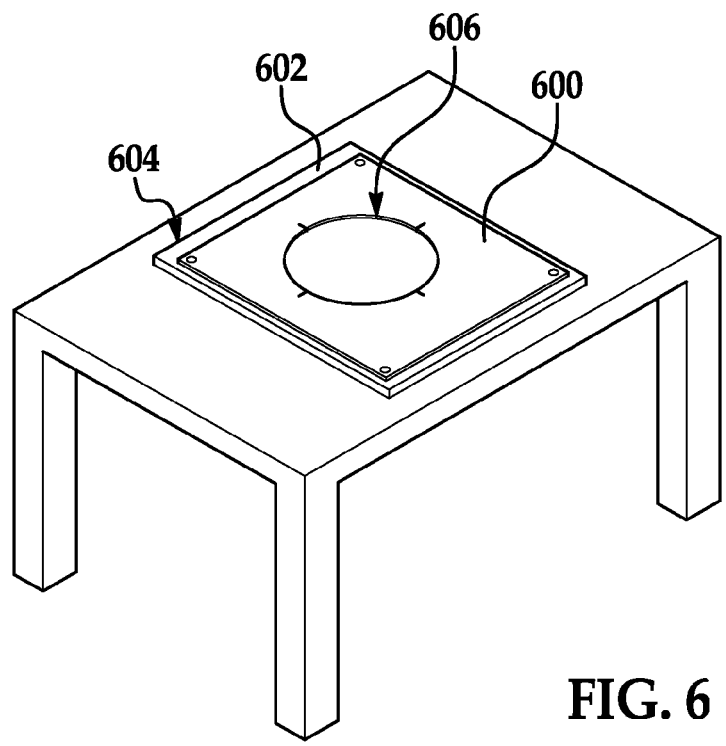
FIG. 6 is an illustration of a diagram showing a mask on a part in accordance with an advantageous embodiment.

With reference now to FIGS. 6-12, diagrams illustrating application of adhesive and beads to a part are depicted in accordance with an advantageous embodiment. FIG. 6 is a diagram of a mask on a part in accordance with an advantageous embodiment. With reference first to FIG. 6, mask 600 may be placed on surface 602 of part 604. Mask 600 may expose area 606 on surface 602. Area 606 may be an area on which adhesive may be applied.

Figure 7:
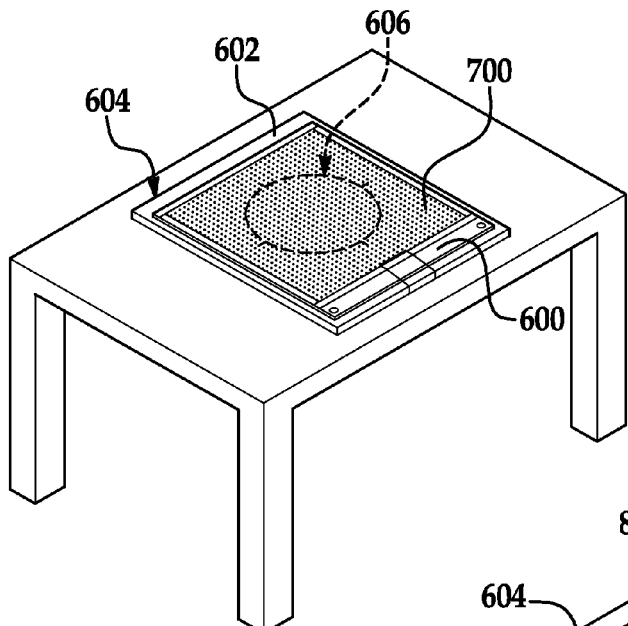
FIG. 7 is an illustration of a diagram showing a part being prepared for an adhesive in accordance with an advantageous embodiment.

With reference to FIG. 7, a diagram of a part being prepared for an adhesive is depicted in accordance with an advantageous embodiment. In this example, screen 700 has been placed over mask 600 on part 604. As a result, adhesive may only pass through screen 700 onto surface 602 in area 606 of part 604.

Figure 8:
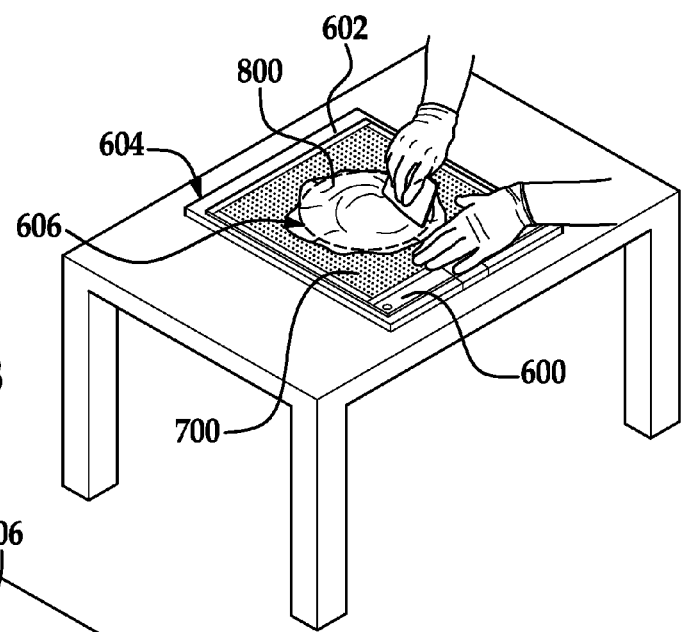
FIG. 8 is an illustration of a diagram showing application of an adhesive and beads in accordance with an advantageous embodiment.

With reference now to FIG. 8, a diagram illustrating application of an adhesive and beads is depicted in accordance with an advantageous embodiment. In this example, adhesive and beads 800 may be applied to surface 602 through screen 700. Adhesive and beads 800 may only be applied to area 606 because of mask 600.

Figure 9:
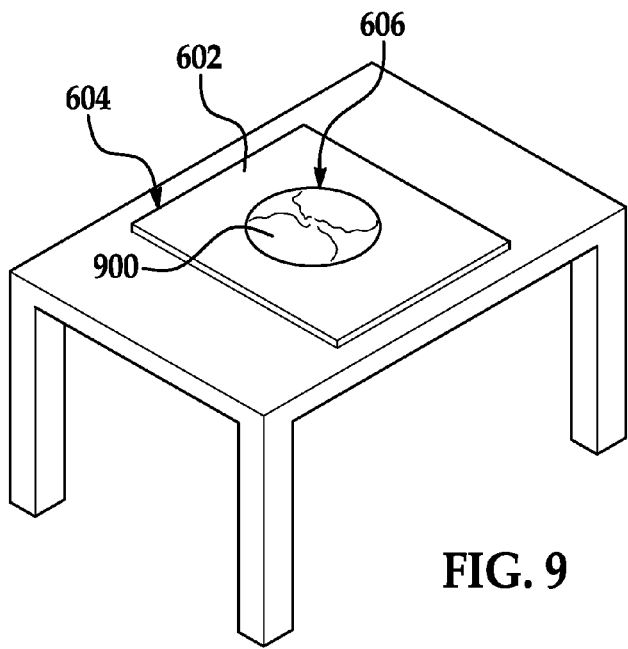
FIG. 9 is an illustration of a diagram showing a part with adhesive and beads in accordance with an advantageous embodiment.

In FIG. 9, a diagram of a part with adhesive and beads is depicted in accordance with an advantageous embodiment. In this example, layer of adhesive and beads 900 remains after removal of screen 700 (not shown) and mask 600 (not shown). Part 604 may now be ready for joining and/or bonding.

Figure 10:
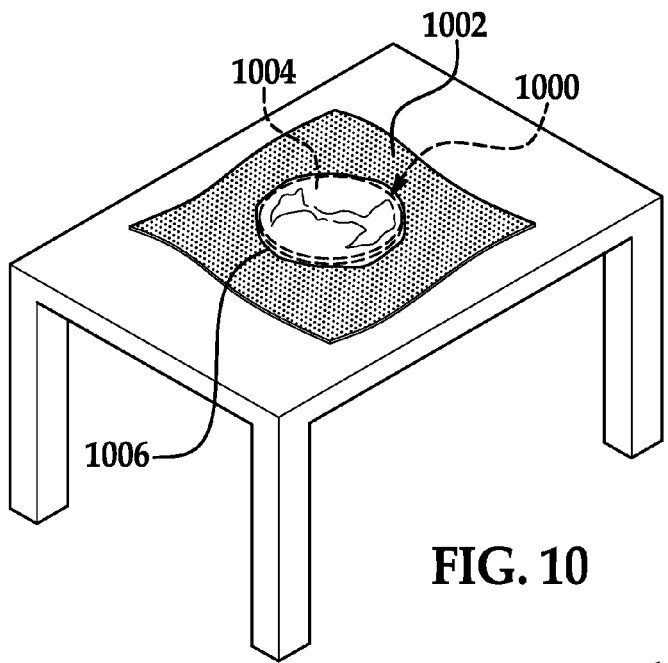
FIG. 10 is an illustration of a diagram showing application of adhesive to a part in accordance with an advantageous embodiment.

With reference now to FIG. 10, a diagram illustrating application of adhesive to a part is depicted in accordance with an advantageous embodiment. In this example, part 1000 has screen 1002 placed on surface 1004. Adhesive 1006 may have been applied to surface 1004 through screen 1002. In this example, adhesive 1006 may not include beads.

Figure 11:
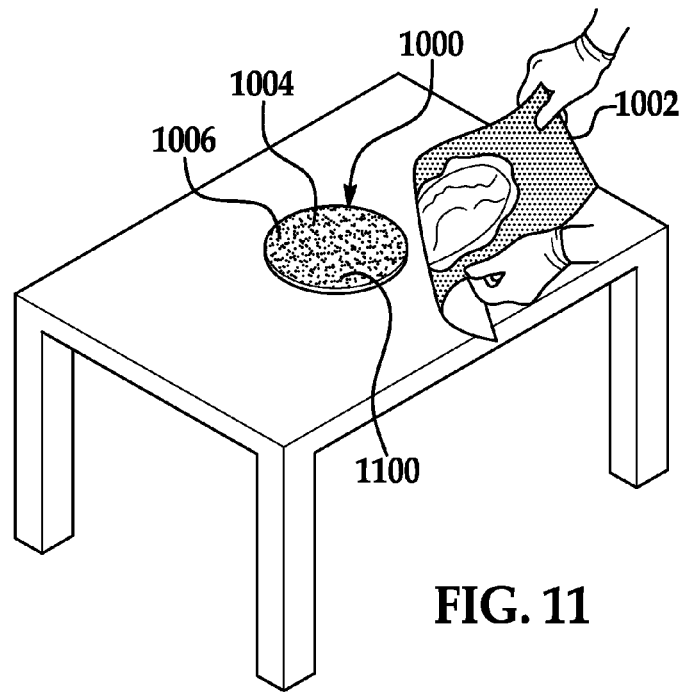
FIG. 11 is an illustration of a diagram showing removal of a screen from a part with adhesive in accordance with an advantageous embodiment.

Turning to FIG. 11, a diagram illustrating removal of a screen from a part with adhesive is depicted in accordance with an advantageous embodiment. In this illustrative example, screen 1002 has been removed from part 1000. Adhesive layer 1100 remains on surface 1004. In some advantageous embodiments, adhesive layer 1100 may take the form of an activator.

Figure 12:
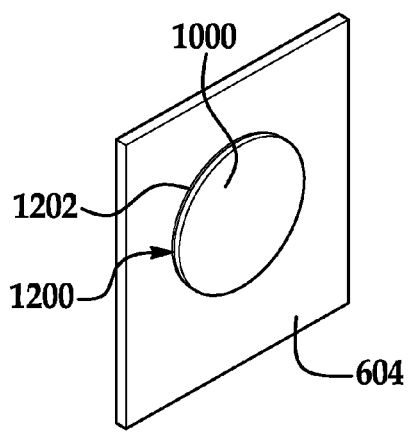
FIG. 12 is an illustration of a diagram showing two parts bonded to each other in accordance with an advantageous embodiment.

With reference now to FIG. 12, a diagram illustrating two parts bonded to each other is depicted in accordance with an advantageous embodiment. In this example, part 1000 may be placed against part 604 and cured to form structural bond 1200 seen as bond line 1202. Part 1000 and part 604 may be cured using heat and application of pressure. The thickness or bond line may be consistent for structural bond 1200 in this example.

The different operations and features illustrated in FIGS. 6-12 are not meant to imply limitations to the manner in which different advantageous embodiments may be implemented. Some advantageous embodiments may have other features and/or operations in addition to, or in place of, the ones illustrated. Further, in some advantageous embodiments, some of the features and/or operations may be unnecessary. For example, in some advantageous embodiments, adhesive 1006 may be unnecessary for part 1000. In yet other advantageous embodiments, screen 700 may be placed onto surface 602 of part 604 with mask 600 being placed onto screen 700.

Figure 13:
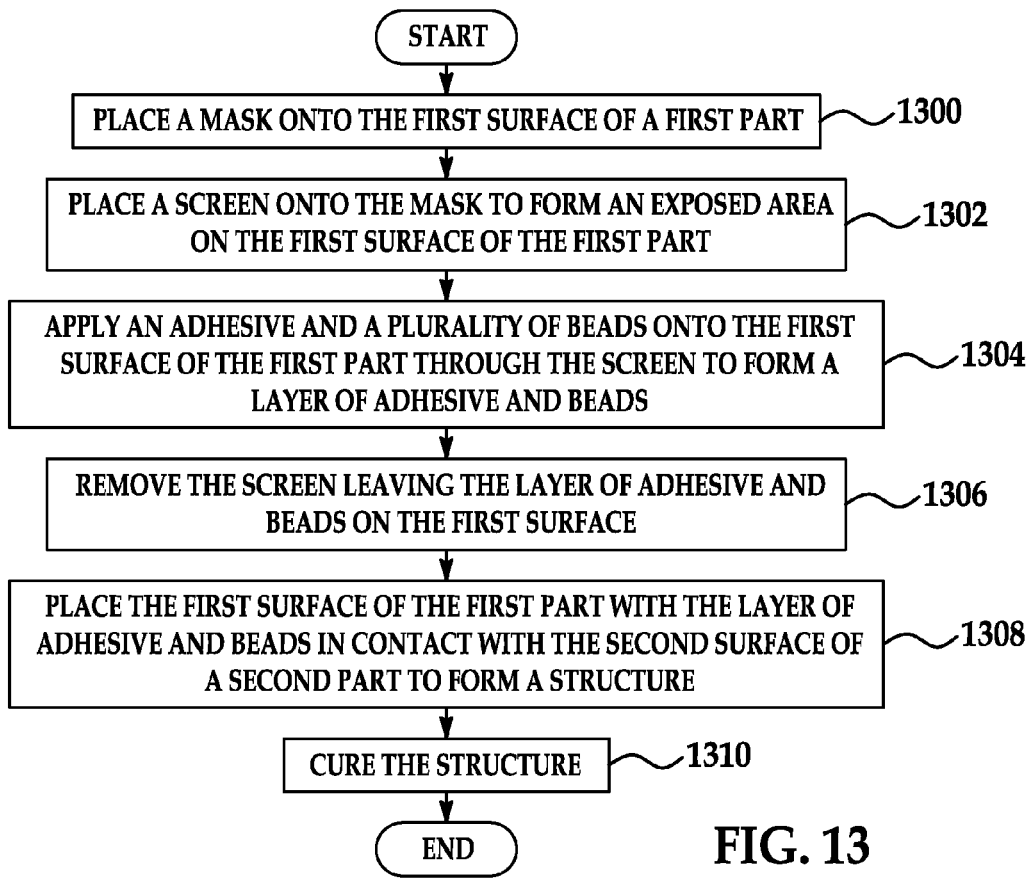
FIG. 13 is an illustration of a flowchart showing a process for bonding parts in accordance with an advantageous embodiment.

With reference now to FIG. 13, a flowchart of a process for bonding parts is depicted in accordance with an advantageous embodiment. The process illustrated in FIG. 13 may be implemented using a bonding environment such as, for example, bonding environment 300 in FIG. 3.

The process may begin by placing a mask onto the first surface of a first part (operation 1300). The process may then place a screen onto the mask to form an exposed area on the first surface of the first part (operation 1302). The process may then apply an adhesive and a plurality of beads onto the first surface of the first part through the screen to form a layer of adhesive and beads (operation 1304). The screen may be removed leaving the layer of adhesives and beads on the first surface of the first part (operation 1306).

The process may place the first surface of the first part with the layer of adhesive and beads in contact with the second surface of a second part to form a structure (operation 1308). The process may cure the structure (operation 1310), with the process terminating thereafter.

Figure 14:
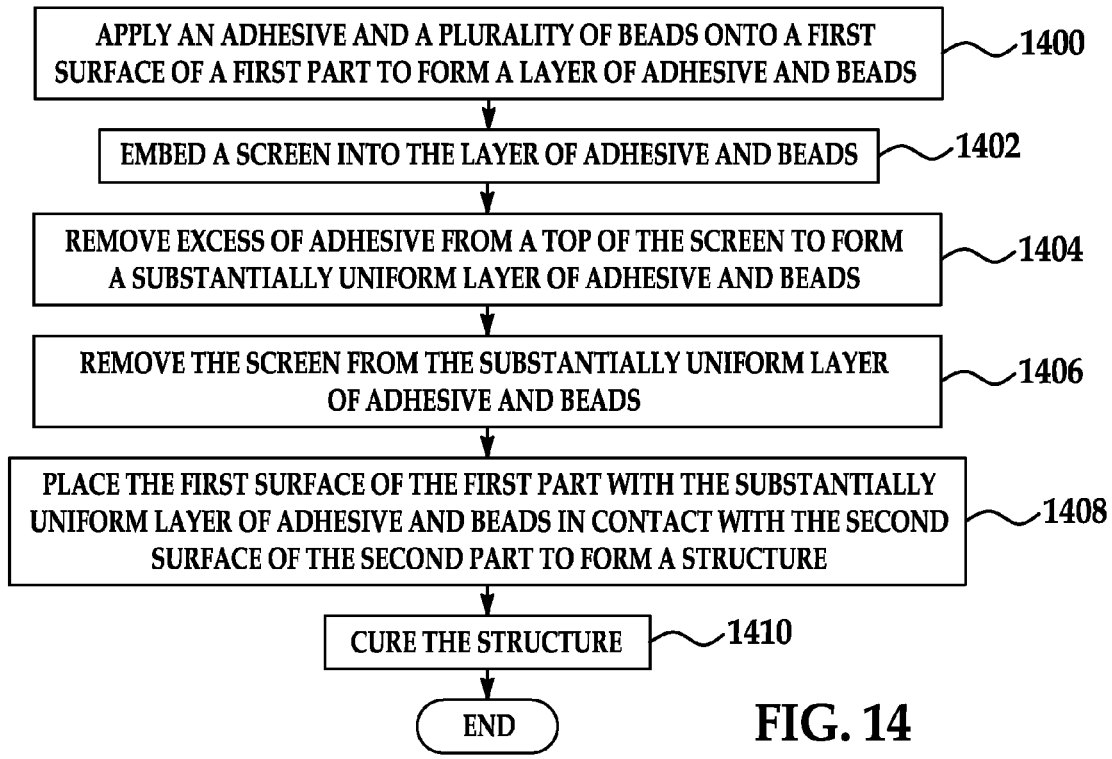
FIG. 14 is an illustration of a flowchart showing a process for bonding parts in accordance with an advantageous embodiment.

With reference now to FIG. 14, a flowchart of a process for bonding parts is depicted in accordance with an advantageous embodiment. The process illustrated in FIG. 14 may be implemented using a bonding environment such as, for example, bonding environment 300 in FIG. 3.

The process may begin by applying an adhesive and a plurality of beads onto a first surface of a first part to form a layer of adhesive and beads (operation 1400). The process may then embed a screen into the layer of adhesive and beads (operation 1402). Excess of adhesive may be removed from a top of the screen to form a substantially uniform layer of adhesive and beads (operation 1404). The screen may then be removed from the substantially uniform layer of adhesive and beads (operation 1406).

The first surface of the first part with the substantially uniform layer of adhesive and beads may be placed in contact with the second surface of a second part to form a structure (operation 1408). The process may then cure the structure (operation 1410), with the process terminating thereafter.

The process illustrated in the flowcharts in FIGS. 13 and 14 may be performed in a number of different ways. In some advantageous embodiments, other operations may be used in addition to, or in place of, the ones illustrated. Further, some operations may be performed simultaneously. In yet other advantageous embodiments, some operations may be omitted.

For example, operation 1306 may be omitted to leave the screen and beads in place when placing the first surface in contact with the second surface. In yet other advantageous embodiments, the layer of adhesive may be placed through the screen without beads and the screen left in place. For example, in some advantageous embodiments, adhesive also may be applied to the second surface of the second part.

In another example, the adhesive may not include beads. As another example, the application of the adhesive and the plurality of beads onto the first surface may be performed by applying a mixture of the adhesive and the plurality of beads. In other advantageous embodiments, the adhesive may be applied to the first surface. The beads may then be applied to the first surface through the screen.

Thus, the different advantageous embodiments provide a method and apparatus for bonding parts to each other. The different advantageous embodiments may provide a capability to create a layer of adhesive that may have a thickness that is around a substantially desired value. Further, the use of beads in the adhesive may maintain the layer of adhesive with the value for the desired thickness. Further, when pressure is applied to the parts, the layer of adhesive and beads may maintain a substantially uniform thickness throughout.

With one or more of the advantageous embodiments, repeatability may be provided in bonding parts. In the illustrative examples, repeatability may include, for example, without limitation, consistent structural bonds, consistent strength, consistent design, and certification margins as structural integrity of parts may be more predictable using different advantageous embodiments. These and possible other features may provide easier and quicker certification of parts and/or products.

Figure 15:
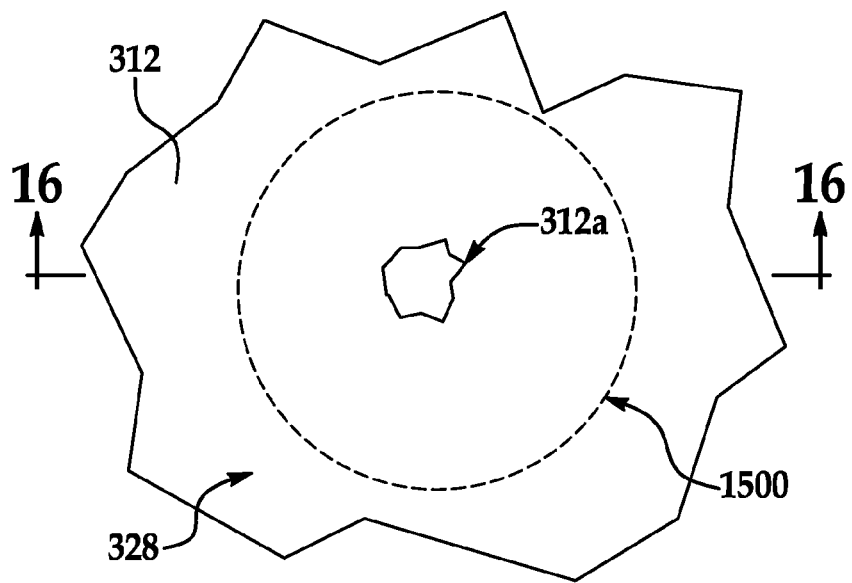
FIG. 15 is an illustration of a plan view of a section of a structure having an area requiring rework.
Figure 16:
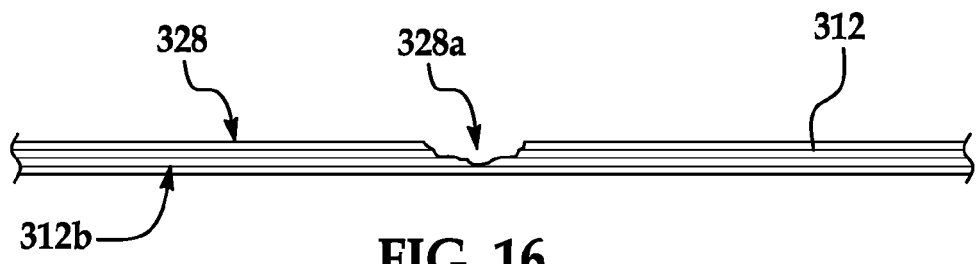
FIG. 16 is an illustration of a sectional view taken along the line 16-16 in FIG. 15.

Attention is now directed to FIGS. 15 and 16 which illustrate a composite skin panel 312 such as that which may be found on an airplane. In this example, the skin panel 312 has a localized area 312a that is to be reworked. As used herein, "rework", "reworked" and "reworking" are used in their broadest sense and are intended to include, without limitation, rework, repair, restoration, improvements and modifications that may either return a structure to its original loading carrying ability and/or specifications, or improve or increase the performance of the structure in one or more respects. In the illustrated example, the area 312a is a depression 328a (FIG. 16) which extends down from the outer surface 328 into several plies 312b of the skin panel 312.

In some situations, such as when the aircraft is required to remain in service and it is important to avoid schedule interruptions, it may be necessary to perform the rework "in the field" outside of a hangar environment where specialized equipment, special handling and/or skilled maintenance technicians are available. For example, it may be necessary to perform the necessary rework within a limited time while the airplane is parked at an airport gate in order to avoid a schedule delay. In accordance with the disclosed embodiments, the needed rework may be performed relatively quickly by workers such as line mechanics who may have limited knowledge of composite materials.

Figure 17:
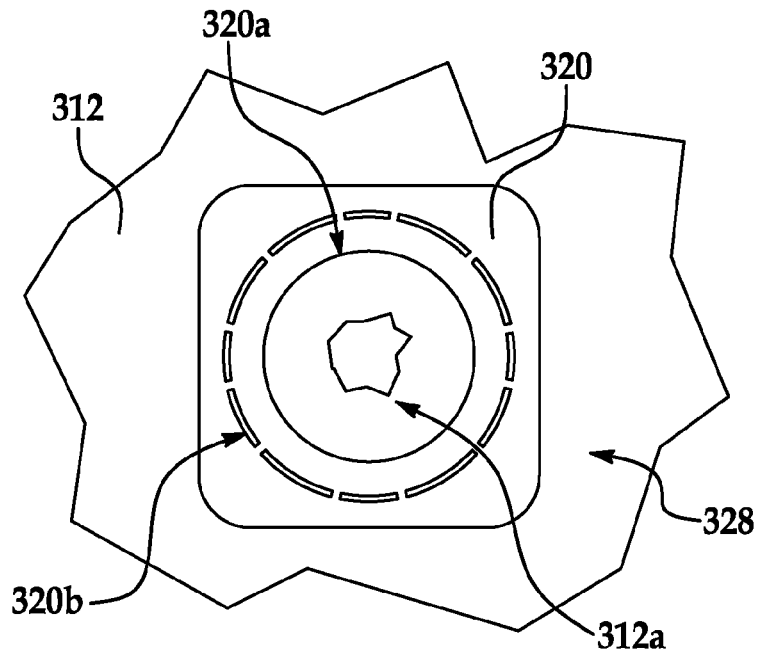
FIG. 17 is an illustration of a plan view showing a template having been placed over the area being reworked.

The rework may begin by reworking a section 1500 (FIG. 15) generally surrounding the area 312a requiring rework. Referring to FIG. 17, a template mask 320 includes a central opening 320a, which in the illustrated example, is substantially circular, however other shapes of openings are possible, depending on the application. The central opening 320a may serve as both a sanding template during the preparation of the surface 328 of the skin panel 312, and as a template for centering a patch 314 (FIG. 18) over the area 312a requiring rework. The template mask 320 further includes ring shaped, intermittent perforations 320b concentrically surrounding the central opening 320a. The ring shaped perforations 320b may be used to mark the outer boundary on the surface 320a where paint is to be removed from the skin panel 312 as part of the rework process. Further details of the process for preparing the surface 328 to receive the bonded patch 314 will be discussed below in more detail.

Figure 18:
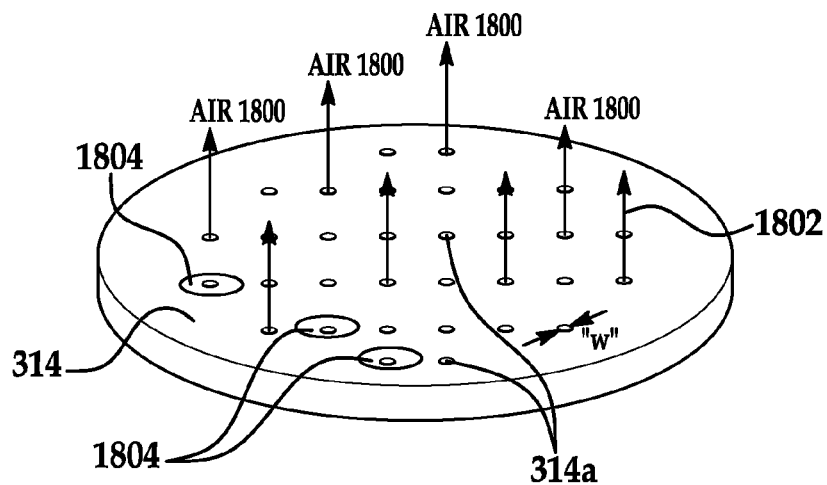
FIG. 18 is an illustration of an isometric view of the patch, and showing perforations therein.

FIG. 18 illustrates a patch 314 suitable for reworking the area 312a on the skin panel 312 shown in FIGS. 15-17. In this example, the patch 314 is substantially circular and includes a plurality of through hole perforations 314a that are distributed across the patch 314. As will be discussed below, the perforations 314a may allow the escape of air 1800, as shown by arrows 1802 from beneath the patch 314 as it is being compacted against the surface 328 of the skin panel 312 during the patch installation process. Desirably, each of the perforations 314a may have a diameter or maximum width "w" that is sufficiently great to also allow the escape of excess adhesive 1804 from beneath the patch 314.

Figure 19:
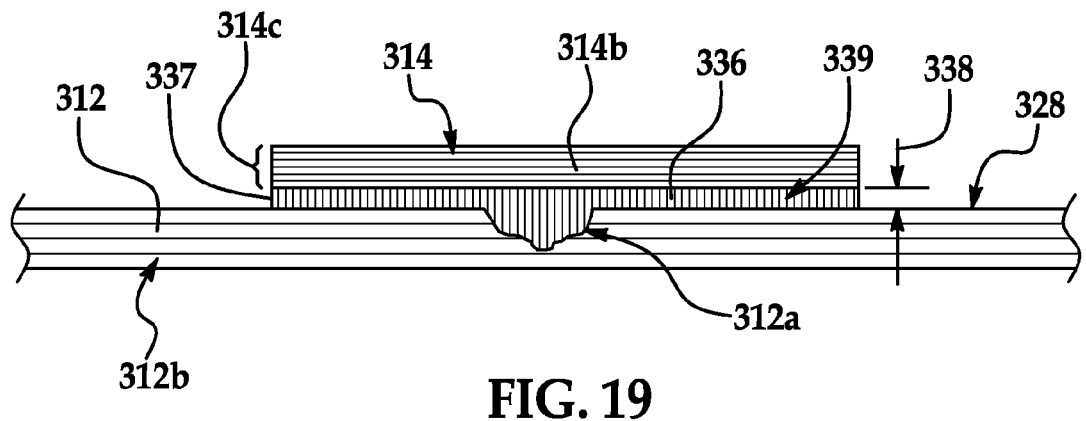
FIG. 19 is an illustration of a sectional view of the structure shown in FIG. 15 in which a patch and a layer of adhesive have been placed over the area requiring rework.

Referring now to FIG. 19, the patch 314 may comprise multiple plies 314b of pre-cured composite materials. The patch 314 is bonded to the skin panel 312 overlying the area 312a to be reworked by a layer of viscous adhesive 336 forming a bond line 337 having a controlled thickness 338. As used herein, "viscous" refers to the fact that the adhesive 336 is spreadable and may flow to some degree as force is applied to it. The layer of adhesive 336 may be a fast curing type of adhesive tailored to the particular application by selecting predetermined viscosity, tackiness and surface tension properties in its uncured state. The viscosity and tackiness of the adhesive 336 should be such that it will stick to the skin panel 312 and/or the patch 314, yet remain flowable during completion of the patch installation process.

The adhesive may include the previously discussed beads 334, and/or a screen 318 (see FIG. 3). The screen 318 and/or the beads 334 function as a spacer 339 having a thickness that substantially corresponds to the desired thickness 338 of the bond line 337. In other embodiments, the screen 318 may be used to apply adhesive 332 to the controlled thickness 338 of the desired bond line 337, following which the screen 318 may be removed prior to the application of the patch 314, in which case the remaining beads 334 assist in controlling the thickness 338 of the bond line 337. The layer 336 of adhesive 332 and beads 334 substantially fill the area 312a being reworked, including the depression 328a (FIG. 16) in the skin panel 312.

The amount of adhesive 332 that is applied to the patch 314 and/or the skin panel 312 may vary with the particular application, including the size and the depth of the area 312a requiring rework. Where nearly the correct amount of adhesive 332 is applied and is substantially evenly spread over the rework area 312a, it is possible that little or no excess adhesive 332 may be squeezed through the perforations 314a as the patch 314 is being compacted. In this case, only air (from air pockets) may be expelled as result of the adhesive 332 redistributing itself beneath the patch 314 so as to even out high and low areas of adhesive 332 and fill the air pockets. In other cases however, where more than the correct amount of adhesive 332 is applied, it may be possible to use observations of the location and/or the amount of excess adhesive 332 that is squeezed out through the perforations 314a as a guide to determine whether conditions have been met for achieving a satisfactory bond. In any event, the perforations 314a may assist in allowing the adhesive 332 to be redistributed beneath the patch 314 in a manner such that the adhesive contacts substantially the entire area of the patch 314. A rework technician's observations of excess adhesive 332 being squeezed through the perforations 314a may be used to assist in confirming that any air pockets have been substantially eliminated and that the adhesive 332 is in contact with substantially the entire area of the patch 314.

Figure 20:
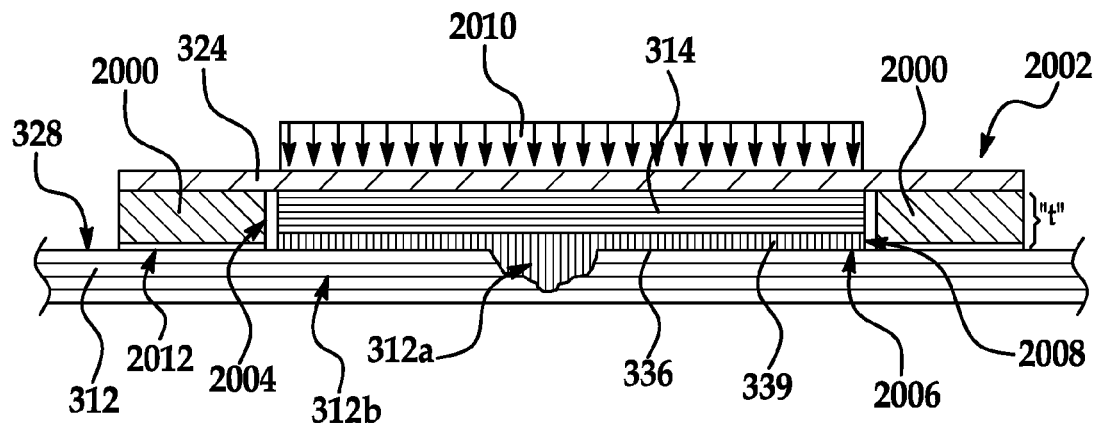
FIG. 20 is an illustration of a view similar to FIG. 19 but showing a caul plate and an anti-caul plate having been installed over the patch.
Figure 21:
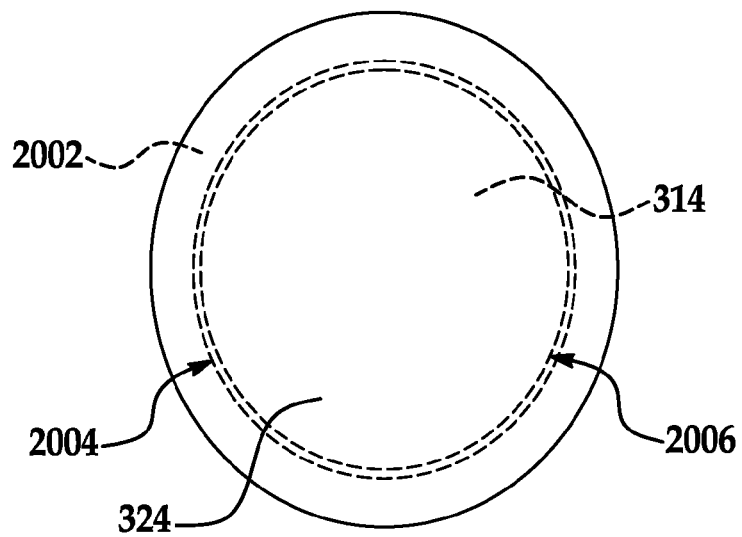
FIG. 21 is an illustration of a top view showing the caul plate wherein the position of the anti-caul plate and the patch is indicated in the phantom.

Attention is now directed to FIGS. 20 and 21 which illustrate a caul plate 324 placed over the patch 314 in preparation for compacting the patch 314 down onto the surface 328 of the skin panel 312. In accordance with the disclosed embodiments, a ring shaped anti-caul plate 2000 is placed between the caul plate 324 and the surface 328 of the skin panel 312, near the outer perimeter 2002 of the caul plate 324, so as to support the caul plate 324 at its outer perimeter 2002. The interior edge 2004 of the anti-caul plate 2002 is radially spaced slightly outside of the outer periphery 2006 of the patch 314. The anti-caul plate 2000 has a thickness "t" substantially equal to the combined thickness 314c of the patch 314 and the desired thickness 338 of the bond line 337. The bottom surface 2012 (FIG. 20) of the anti-caul plate 2000 engaging the surface 328 of the skin panel 312 is shown as being flat in the illustrated example, however the bottom surface 2012 may have other shapes or contours that may be selected to match the shape/contour of the surface 328 of the skin panel 312. In the illustrated example, the anti-caul plate 2000 has the shape of a continuous ring (see FIG. 21), however other shapes are possible. Also, in other embodiments the anti-caul plate 2000 may comprise two or more contiguous or spaced part sections (not shown) which support the outer perimeter 2002 of the caul plate 324 at multiple locations around the patch 314.

The anti-caul plate 2000 functions to react force applied by the caul plate 324 to the patch 314 near the outer periphery 2006 of the patch 314. By supporting the outer perimeter 2002 of the caul plate 324, the anti-caul plate 2000 may reduce or prevent substantial tipping, slanting and/or bending of the caul plate 324. As a result of controlling this force at the outer periphery 2006 of the patch 314, the force 2010 applied to the caul plate 324 is substantially constant over substantially the entire area of the patch 314. Consequently, the tendency of the caul plate 324 to apply higher forces near the outer periphery 2006 of the patch 314 (due to bending, tipping, slanting, etc.) may be avoided, which could otherwise result in tapering of the bond line 337 near the outer periphery 2006 of the patch 314. Therefore, the thickness 338 of the bond line 337 may remain substantially constant over the entire area of the patch 314 during the compaction process.

Figure 22:
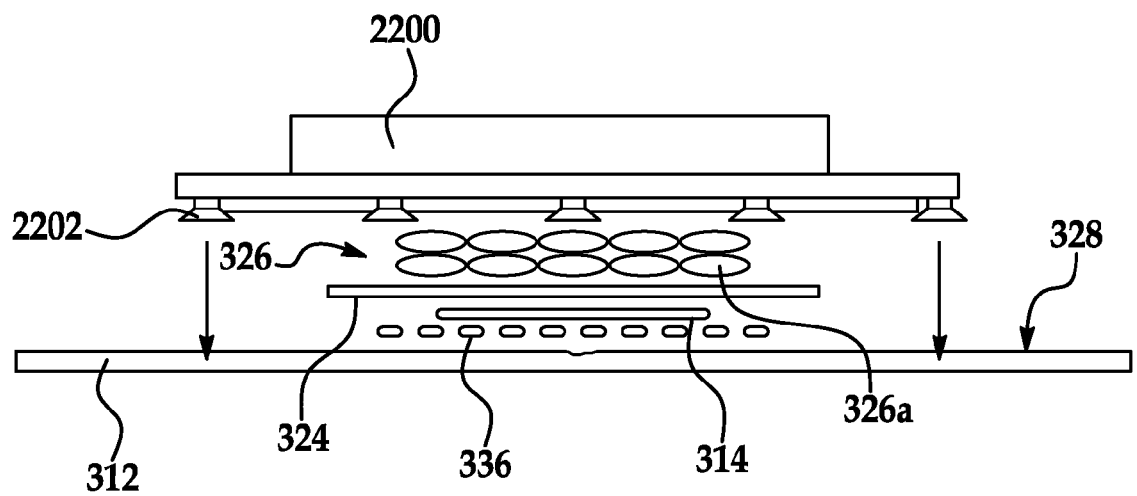
FIG. 22 is an illustration of an exploded view of apparatus for carrying out the patching method, including a heat pack and a compactor for applying force to the patch.

FIG. 22 illustrates one embodiment of equipment that may be used to heat and compact the patch 314 in field applications. A heat source 326 (FIG. 3) in the form of a heat pack 326a is placed on top of the caul plate 324 and a compactor 2200 is positioned over the caul plate 324 and heat pack 326a. The compactor 2200 may include a series of suction devices 2202 which releasably mount the compaction device 2200 on the surface 328 of the skin panel 312. The heat pack 326a applies the heat necessary to cure the adhesive layer 336 while the compactor 2200 applies the force to the caul plate 324 necessary to compact the patch 314 against the surface 328 of the skin panel 312. Other forms of portable compaction devices may be employed to apply the necessary compaction force to the patch 314. For example, a vacuum bag assembly (not shown) may be assembled over the heat pack 326a, caul plate 324 and patch 314, which is then sealed to the surface 328 of the skin panel 312. Alternatively, depending upon the location of the patch 314 on the skin panel 312, the compaction device may comprise a simple weight (not shown) that relies on gravity to apply the necessary compaction force to the patch 314.

Figure 23:
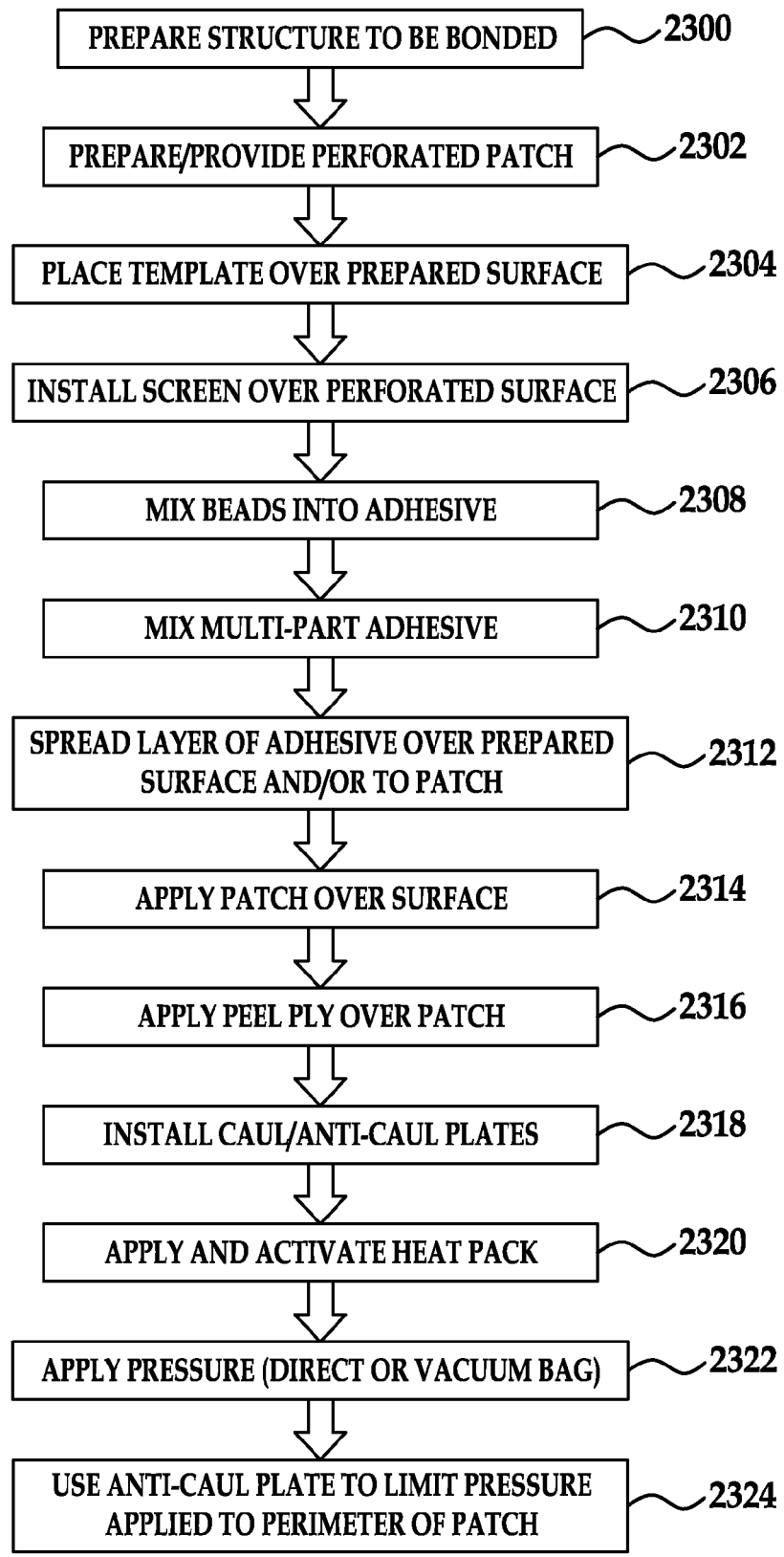
FIG. 23 is an illustration of a flow diagram showing the steps of a method for reworking a structure using a bonded patch.

Attention is now directed to FIG. 23 which broadly illustrates the steps of a method of reworking an area 312a on a structure, such as the previously described composite skin panel 312. The method begins at step 2300 in which a structure, such as the skin panel 312 is prepared to receive the bonded patch 314. Preparation of the substructure may involve removing any protruding material that may prevent the patch 314 from laying flush with the surface of the structure. The protruding material may be removed, without limitation, by trimming or sanding. Step 2300 also includes placing the template mask 320 (FIG. 17) over the structure and marking the outer boundaries 320b (FIG. 17) of the area where paint and other surface coatings may be removed prior to the bonding process. The template mask 320 may also be used as a surface material removal guide during step 2300. Suitable solvents may be used as part of step 2300 in order to clean the structure surface of contaminates, including sanding dust.

Next, at 2302, a suitable patch 314 is prepared in which a pre-cured doubler (314) is selected and trimmed in size and shape to fit properly over the rework area 312a. At step 2304, the template mask 320 may be placed over the skin surface and held in place, as by tape.

At step 2306, a screen 318 may be placed over the prepared surface, overlying the template mask 320, in preparation for the application of adhesive. At 2308, optionally, the previously discussed beads 334 may be mixed into at least one component of the adhesive 332 and at 2310, the component parts of the adhesive 332 may be mixed together to form a relatively quick drying bonding adhesive. In some embodiments, the adhesive 332 may comprise only one component, in which case the beads 334 may be mixed into the single component. Next, at 2312, a layer of the adhesive 332, optionally containing the beads 334, may be spread over the prepared skin surface 328 and/or to the patch 314 using an applicator 322 which may comprise, for example and without limitation, a toothed trowel (not shown) that may be used to achieve a predetermined thickness of the adhesive. In those applications where the optional screen 318 is employed, a slightly larger, excess amount of adhesive than is ultimately needed may be applied in order to reduce the possibility of air pockets, since the screen 318 may be used to control the final thickness of the adhesive layer 336. The trowel may be used to evenly spread the adhesive over the structure surface 328 and the patch 314. The template mask 320 may be used to control the shape and location of the adhesive layer 336 applied to the structure surface 328. It should be noted here that the template mask 320 and the screen 318 may be combined into as single component and manufactured using well known photolithographic techniques.

At 2314, the patch 314 is centered over the rework area 312a using the template mask 320 and the patch 314 is applied by hand to the structure surface 328, using the template mask 320 as a guide to locate and center the patch. Next, a peel ply (not shown) may be placed over the patch 314, following which, at 2318, the caul plate 324 and the anti-caul plate 2002 may be installed, as shown in FIG. 20.

At step 2320, a suitable heating source 326, such as the heat pack 326a (FIG. 22) may be placed over the caul plate 324 and may be activated. The heat pack 326a may be a self contained package, such as a chemical heat pack that is activated by breaking a frangible seal (not shown) and kneading the pack until chemicals contained in the pack thicken and produce heat by an exothermic reaction. In some applications, an adhesive 332 may be employed that cures at room temperature, in which case the heat pack 326a or similar heat source may not be necessary. Next, at step 2322, pressure is applied to the combination of the heat pack 326a, caul plate 324 and patch 324 by any of several means. For example, a vacuum compaction unit 2200 may be placed over the patch 324 and secured to surface 328 using suction cups 2202. The compaction unit 2200 may comprise a vacuum unit which, when activated, draws a vacuum over the reworked area that results in a downward force being applied to the caul plate 324 which in turn forces the patch 314 down against the surface 328 of the structure. Alternatively, a vacuum bag assembly (not shown) may be assembled over the reworked area and sealed to the surface of the skin panel, following which a vacuum may be drawn in the bag assembly to apply pressure to the patch 314. Finally, as previously mentioned, in some applications, it may be possible to apply the necessary pressure to the patch 314 by placing a weight (not shown) on the caul plate 324.

When the patch 314 is initially applied to the structure surface 328, air pockets (not shown) may be present either within the adhesive layer 336, or between the adhesive layer 336 and the patch 314. One or more of these air pockets may be the result of there being slight variations in the thickness of the adhesive layer 336 which creates high or low spots in the adhesive. As the caul plate 324 applies pressure to the patch 314, the perforations 314a (FIG. 18) allow air, as well as excess adhesive 1804 to escape or "squeeze-out" from the patch 314, thereby allowing the adhesive to spread evenly to a substantially uniform, predetermined thickness 338. The beads 334 and/or the screen 318 act as a spacer 339 (FIGS. 19 and 20) to assist in maintaining the desired bond line thickness 338.

As pressure is applied to the patch 314 by the caul plate 324, the anti-caul plate 2000 reacts the force applied near the periphery 2006 of the patch 314 so that the pressure applied over the entire area of the patch 314 may be substantially uniform. Further, as pressure is applied to the patch 314 during the compaction and curing process, the beads 334 and/or the screen 318 function as a spacer 339 to partially react the applied force which results in a desired thickness 338 of the bond line 337.

Figure 24:
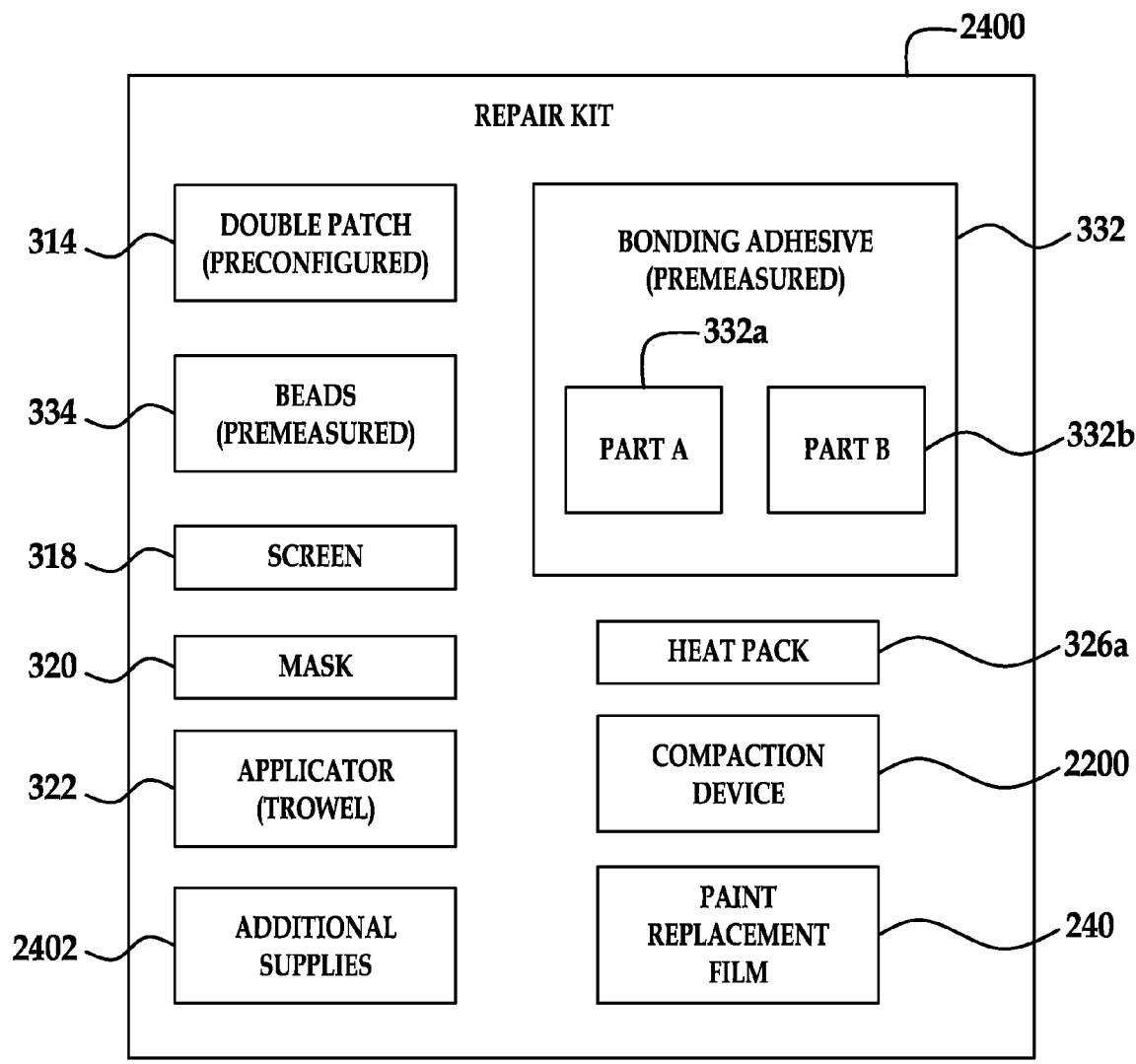
FIG. 24 is an illustration of a block diagram showing components of a pre-packaged kit that may be used to rework a structure using a bonded patch.

Attention is now directed to FIG. 24 which illustrates, in block diagram form, the components of a prepackaged rework kit 2400 that may be used by personnel to perform relatively rapid reworking of composite skin panels or similar structures in the field. The kit 24 may include a preconfigured doubler patch 314, a pre-measured amount of beads 334, a mesh-like screen 318, a template mask 320, an adhesive applicator such as a tooth trowel 322, a bonding adhesive 332 including pre-measured amounts of multiple reactive parts 332a, 332b, a heat pack 326a for use in curing the adhesive, a compaction device 2200 for applying pressure to the patch, a paint replacement film 240 that may be used to replace any paint on the skin surface that was previously removed, and any number of additional supplies 2402 such as cleaning supplies, solvents, gloves, release films, etc. that may be necessary to carry out the rework described above.

The description of the different advantageous embodiments has been presented for purposes of illustration and description, and it is not intended to be exhaustive or limited to the embodiments in the form disclosed. Many modifications and variations will be apparent to those of ordinary skill in the art. Although the different advantageous embodiments have been described with respect to aircraft, other advantageous embodiments may be applied to other types of platforms.

For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object. For example, the different advantageous embodiments may be suitable for bonding wood parts for objects, such as a building, a boat, and/or some other object that includes wood parts.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed:

1. A method of reworking an area of a structure, comprising:
    placing a layer of viscous bonding adhesive of a substantially uniform thickness, with at least one spacer, over and around the area, the at least one spacer having a size that is about equal to said substantially uniform thickness;
    placing a patch on the layer of viscous bonding adhesive and over and around the area;
    placing an anti-caul plate around a periphery of the patch, the anti-caul plate surrounding an entirety of the patch; and
    pressing the patch against said viscous bonding adhesive using a caul plate, the caul plate covering the entirety of the patch and also covering at least a portion of the anti-caul plate.

2. The method of claim 1, wherein placing a spacer between the patch and the structure includes introducing at least one of a plurality of beads and a screen into the adhesive.

3. The method of claim 1, wherein placing the spacer includes introducing the spacer into the adhesive before the adhesive is placed between the structure and the patch.

4. The method of claim 1, further comprising:
    preparing a surface of the structure;
    preparing the viscous bonding adhesive by mixing at least two reactive components;
    placing a template over the surface of the structure defining the area on the structure to be reworked, and wherein placing the bonding adhesive includes using the template to apply the adhesive to the defined area of the structure; and
    applying a heat producing device over the patch to cure the layer of adhesive.

5. The method of claim 1, wherein the patch includes perforations, the method further comprising:
    using the perforations in the patch to allow at least one of air and adhesive to be squeezed out from the patch through the perforations in the patch as the patch is pressed against the said viscous bonding adhesive; and
    confirming that any air beneath the patch has been substantially eliminated by observing flow of excess adhesive through the perforations in the patch.

6. The method of claim 1, wherein the spacer comprises a substantially non-compressible screen through which the viscous bonding adhesive may pass.

7. The method of claim 1, wherein the spacer comprises a plurality of substantially non-compressible beads dispersed in the viscous bonding adhesive.

8. The method of claim 1, wherein the patch includes perforations, the method further comprising:
    using the perforations in the patch to allow at least one of air and adhesive to be squeezed out from the patch through the perforations in the patch as the patch is pressed against the said viscous bonding adhesive.

9. The method of claim 1, wherein an interior edge of the anti-caul plate is radially spaced outside the periphery of the patch, creating a space between the periphery of the patch and the anti-caul plate.

10. The method of claim 9 further comprising:
    allowing some of the viscous bonding adhesive to squeeze out from the periphery of the patch and into the space.

11. The method of claim 1, wherein a shape of a bottom surface of the anti-caul plate is selected to match a shape or contour of a surface of the structure.

12. The method of claim 1 further comprising:
    reducing or preventing substantial tipping, slanting, or bending of the caul plate using the anti-caul plate while the caul plate applies pressure to the patch and to the anti-caul plate.

13. The method of claim 1 further comprising:
    reducing or preventing tapering of a bond line of the viscous bonding adhesive at or near the periphery using the anti-caul plate while the caul plate applies pressure to the entirety of the patch and to the anti-caul plate, thereby promoting a substantially constant thickness of the bond line over the entirety of the patch.

* * * * *